United States Patent [19]

Jones et al.

[11] Patent Number: 5,210,544
[45] Date of Patent: May 11, 1993

[54] MOUNTING MEANS FOR AN ANTENNA INSTALLATION

[75] Inventors: William E. Jones, Beebe; Perry Reed, Cabot, both of Ark.

[73] Assignee: Universal Antenna Manufacturing, Inc., Ward, Ark.

[21] Appl. No.: 785,472

[22] Filed: Oct. 31, 1991

[51] Int. Cl.$^5$ .................................................. H01Q 19/12
[52] U.S. Cl. ..................... 343/840; 343/878; 343/916; 403/187
[58] Field of Search ............... 343/840, 882, 892, 907, 343/912, 878, 916; 403/187, 191, 199, 232.1, 235, 236

[56] References Cited

U.S. PATENT DOCUMENTS

| | | | |
|---|---|---|---|
| 3,514,782 | 5/1970 | Lockwood | 343/882 |
| 3,978,490 | 8/1976 | Fletcher et al. | 343/882 |
| 4,527,167 | 7/1985 | Miladivonic | 343/840 |
| 4,647,943 | 3/1987 | Metcalfe | 343/840 |

FOREIGN PATENT DOCUMENTS

| | | | |
|---|---|---|---|
| 0140904 | 7/1985 | Japan | 343/840 |
| 0738599 | 10/1955 | United Kingdom | 343/907 |

*Primary Examiner*—Michael C. Wimer
*Assistant Examiner*—Tan Ho
*Attorney, Agent, or Firm*—Hill, Steadman & Simpson

[57] ABSTRACT

A steel reinforcement bracket attaches to an aluminum rib of a frame of a dish antenna to relieve the stress causing fatigue in the rib. The bracket is shaped in such a way so as to allow a cradle bracket gripping opposite sides of the rim to form a flat surface against the rib. The reinforcement bracket is secured to the rib and cradle bracket with bolts so as to transfer the stress on the rib to the reinforcement bracket.

4 Claims, 2 Drawing Sheets

MOUNTING MEANS FOR AN ANTENNA INSTALLATION

BACKGROUND OF THE INVENTION

1. Field of the Invention

The present invention generally relates to large dish-shaped antennae of the type used for receiving signals from satellite transmitters.

2. The Prior Art

Typically, a reflecting surface support frame has a central hub and an outer rim with a mount ring located between the hub and the outer rim. The mount ring serves as an attachment between the mount and the support frame. A plurality of angularly spaced radial spokes extend between the central hub to the outer rim.

It is known to employ the use of a U-shaped mount bracket gripping each antenna rib on three sides, i.e. two lateral sides and the back side. A bolt is placed through a hole or slot on one side of the U-shaped mount bracket, through the rib, and out the other side of the bracket and then fastened with a nut. A problem with this assembly is that it makes the bolt a pivot location for the aluminum rib of the antenna when winds are present. The pivoting of the aluminum rib on the steel bolt causes metal fatigue in the aluminum rib and leads to its inevitable destruction.

SUMMARY OF THE INVENTION

The present invention more particularly relates to the connection of the spokes, or ribs, to the mount ring.

A bracket is made of steel so that the mount bolt may pivot against the hard wearing surface of the steel bracket rather than the aluminum rib.

Thus, a mount is provided to support an antenna which will withstand static wind loads as well as severe dynamic conditions.

It is an object of the invention to provide an antenna mount to be held firmly in place such that the mount bolts pivot on a steel bracket rather than the aluminum antenna ribs.

DESCRIPTION OF THE PREFERRED EMBODIMENT

Figure 1:
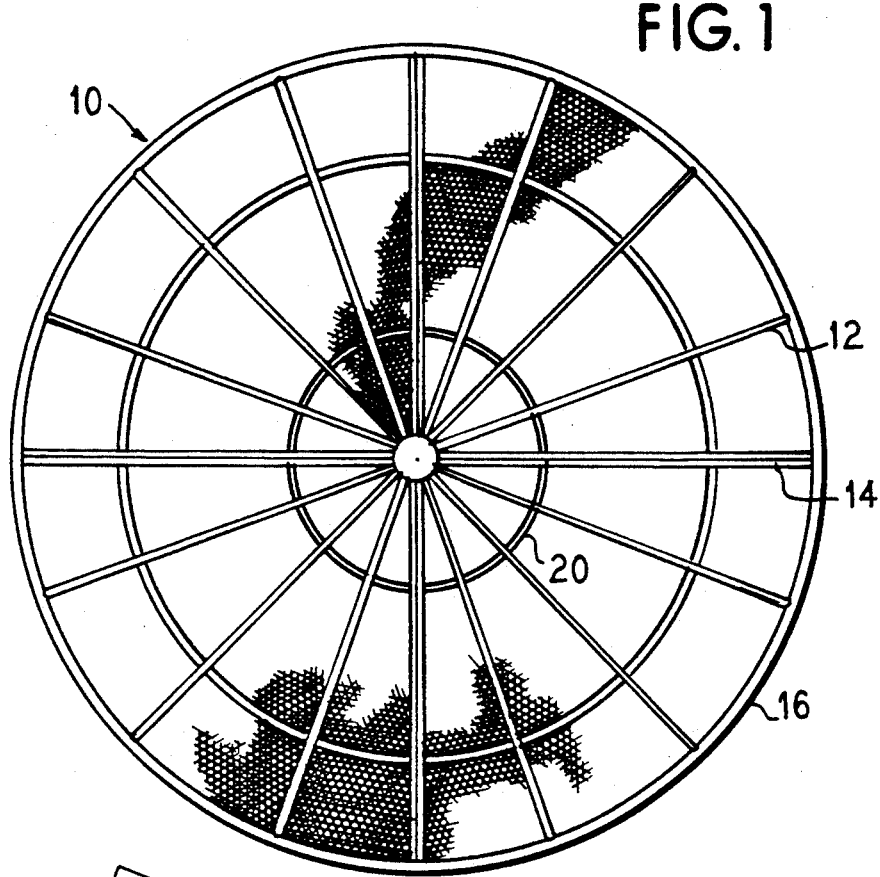
FIG. 1 is a front view of a typical antenna dish and support frame.

Referring to the drawings in detail wherein like numerals are used to designate like parts, a satellite dish 10 is illustrated in FIG. 1 which incorporates the mounting apparatus of the present invention. The satellite dish 10 has a frame which comprises a central hub 18 with a plurality of equiangularly spaced ribs 12, 14. The ribs are either a single rib 12 or a double rib 14 as shown in FIG. 1. The ribs 12, 14 extend radially outwardly from the hub 18 to an outer circumferentially extending peripheral rim 16. A mount ring 20 is concentrically and intermediately positioned between the hub 18 and the outer rim 16. Typically, the diameter of the outer rim 16 may be as great as approximately ten feet, and the corresponding mount ring 20 will have a diameter of approximately three feet. However, these dimensions may be selectively varied without departing from the principles of the invention, as all dishes are not of equal size.

It will be understood that in a typical antenna installation, the dish components are made of lightweight aluminum, a form of material that is not particularly resistant to abrasion or to dynamic forces such as those to which the widespan surfaces of the dish-type antenna may be exposed.

The attachment means 30 has a bight portion connected directly to the support post 28, for example, by a weldment W and includes two spaced apart arms forming a U-shaped cradle bracket 32.

Figure 2:
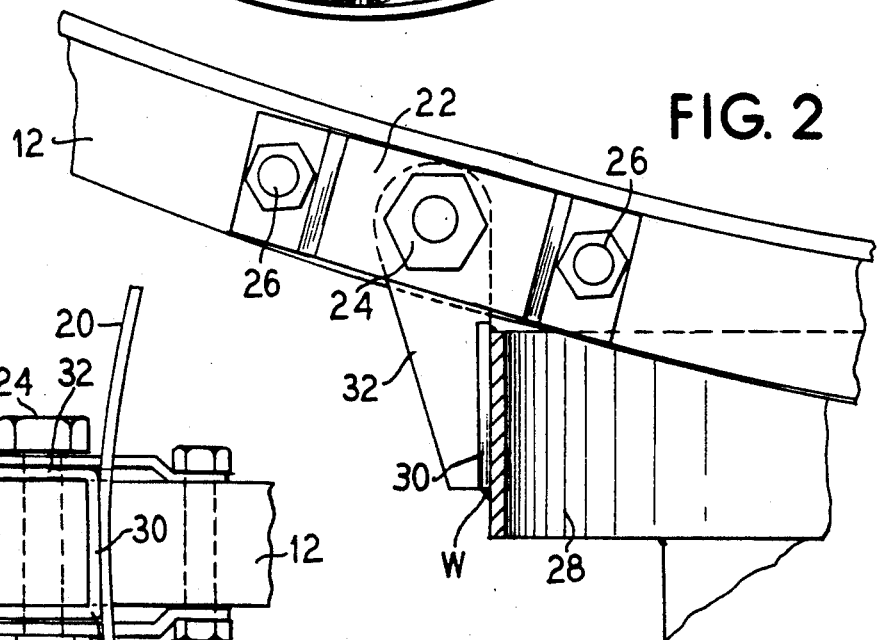
FIG. 2 is an enlarged view of a single rib and its attachment to the antenna base.
Figure 3:
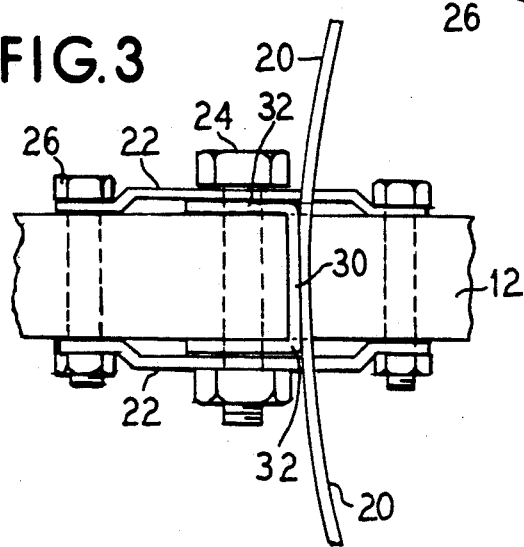
FIG. 3 is a side view of a single rib with a U-shaped cradle bracket between the reinforcement brackets of the present invention.

FIG. 2 shows how a reinforcement bracket 23 of the present invention is mounted on the single rib 12 of the support frame of the satellite dish 10. In accordance with this invention, the bracket 22 is made of steel and thereby presents a tough wear-resistant exterior surface for engagement by adjoining components. The reinforcement bracket 22 is attached to one side of the single rib 12 with two bolts 26 and one mount bolt 24 going through the reinforcement bracket 22 through the single rib 12 and finally through the second reinforcement bracket 22 as shown in FIG. 3. An attachment means 30 extends between the mount bolt 24 and a support post 28 to connect the satellite dish 10 to the support post 28 which is then connected to a base which is ultimately connected to some fixed support or base structure such as a building or the ground.

FIG. 3 shows how the reinforcement brackets 22 of the present invention are mounted on opposite sides of a single rib 12. The reinforcement brackets 22 are attached to the single rib 12 with the bolts 26 going through one side of the reinforcement bracket 22 through the single rib 12 and finally through the reinforcement bracket 22 directly opposite the first reinforcement bracket 22.

The mount bolt 24 is positioned equidistantly between the two other bolts 26 at a location where the reinforcement bracket 22 is indented to accommodate a cradle bracket 32. Therefore, the mount bolt 24 is bolted through the reinforcement bracket 22, the cradle bracket 32, through the single rib 12, and continuing through the opposite side of the cradle bracket 32 and the oppositely placed reinforcement bracket 22. The mount bolt 24 is situated just outside of the mount ring 20 with the other two bolts 26 situated on opposite sides of the mount ring 20. The mount bolt 24 is held firmly in place such that the mount bolt 24 pivots on the wear-resistant reinforcement brackets 22 rather than the aluminum antenna rib 12.

Figure 4:
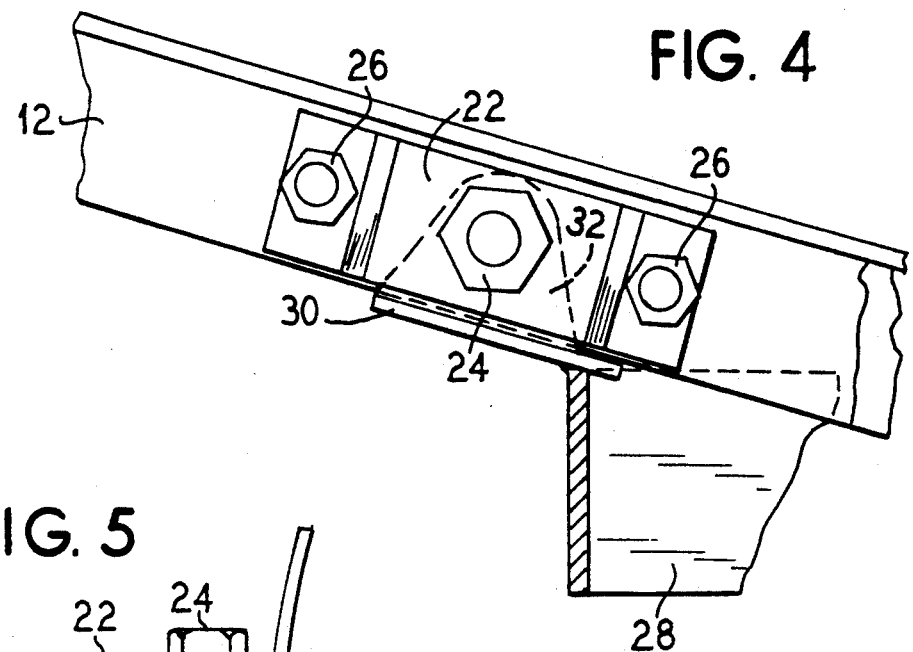
FIG. 4 is an alternate embodiment of the attachment between each rib and the antenna base.

FIGS. 2 and 4 show means for attaching the support post 28 to the frame of the satellite dish 10. Typically, an attachment means 30 extends from the cradle bracket 32 and is attached to the mount bolt 24. Conventional welding techniques are then used.

Figure 5:
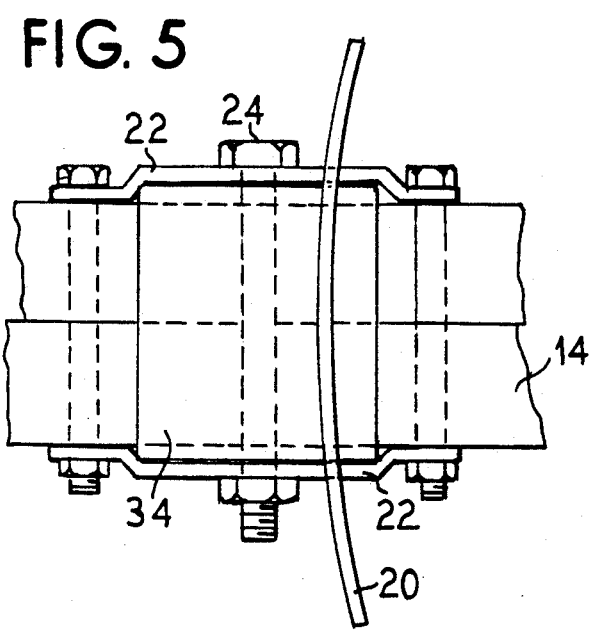
FIG. 5 is a side view of a cradle bracket used with a double rib between the reinforcement brackets of the present invention.

FIG. 5 shows a similar perspective as in FIG. 3 except for a double rib 14 of the frame of the satellite dish 10. In addition, a different cradle bracket 34 is used with the double rib 14 such that the double ribs 14 are held securely together. The cradle bracket 34 fits into the indent of the reinforcement bracket 22 and the mount bolt 24 is bolted through both the reinforcement brackets 22, the double rib 14, and the cradle bracket 34, as is done for the single rib 12 shown in FIG. 3.

Figure 6:
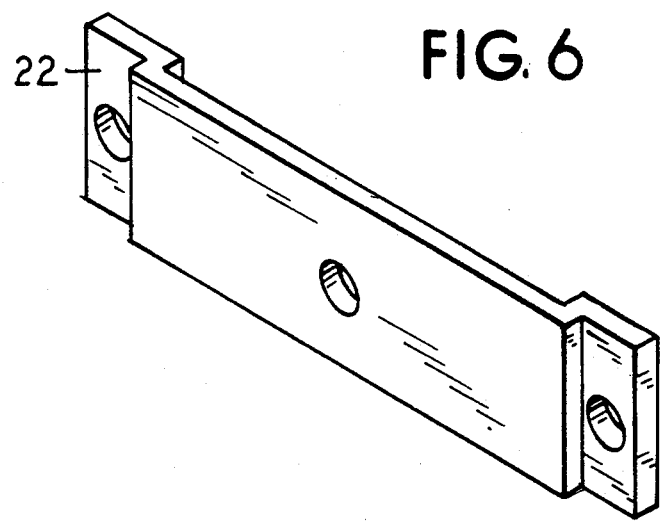
FIG. 6 is an enlarged perspective view of the reinforcement of the present invention.

FIG. 6 illustrates additional details of the reinforcement brackets 22. The figure shows the three holes through which the bolts 24, 26 pass. In addition, the indent is clearly shown such that the cradle bracket 32 of the single rib 12 or the cradle bracket 34 of the double rib 14 may be situated or nested in a seated relationship. The reinforcement bracket 22 is made of a wear-resistant tough material, typically steel, different than the single rib 12 or double rib 14, which is typically lightweight aluminum. This allows the mount bolt 24 to pivot against the reinforcement bracket 22 rather than either the single rib 12 or the double rib 14 in dynamic conditions.

Although various minor changes and modifications might be proposed by those skilled in the art, it will be understood that we wish to include within the claims of the patent warranted hereon all such changes and modifications as reasonably come within our contribution to the art.

We claim as our invention:

1. A mounting means for an antenna installation comprising:
    a satellite antenna dish having a support frame comprising,
        a central hub,
        a plurality of equiangularly spaced ribs made of lightweight aluminum and extending radially outwardly from said hub,
        an outer circumferentially extending peripheral rim connected to the radially outermost ends of said ribs, and
        a mount ring concentrically and intermediately disposed between said hub and said outer rim; and
    a pair of wear-resistant reinforcement brackets mounted to opposite sides of at least one of said ribs.
        each said bracket comprising a flat elongated steel member presenting a tough wear-resistant component for engagement by adjoining components,
        each said bracket having a flat portion at opposite ends for direction surface engagement with an adjoining rib and an intermediate offset indent portion adapted to be spaced away from the adjoining surface of said adjoining rib; and
    a cradle bracket in said indent portion of said reinforcement brackets and adapted to be connected to a support,
        each of said reinforcement brackets having a width approximately the same as the width of the rib; and
        each of said reinforcement brackets having three longitudinally spaced holes disposed on an axis generally parallel to the rib and being centrally located along the width of said corresponding reinforcement bracket,
        the endmost holes of said three holes being disposed respectively in said flat portions at opposite ends of said reinforcement brackets,
        the other hole of said three holes being disposed in said intermediate indent portion of said reinforcement brackets;
    first and second bolts extending through said endmost holes and through the rib and having a nut connected thereto;
    a third bolt extending through said other hole, through said cradle bracket and through said rib and having a nut connected thereto;
    whereby the bolts are pivotally mounted on the wear-resistant brackets rather than on the lightweight aluminum rib.

2. In a mounting means for a satellite antenna dish having radial rib means made of lightweight aluminum, the improvement comprising a pair of elongated flat wear-resistant steel plates forming reinforcement brackets and disposed on opposite sides of one of said rib means,
    said plates each having three openings including a first and a second opening at opposite ends for receiving a first and a second bolt and nut to clamp the plates to the rib means in firm assembly therewith, and
    said plates each having a third intermediate opening between said first and second openings to receive a third mounting bolt and nut;
    a cradle bracket for connection to a support post and connected to said rib and to said reinforcement brackets by said third mounting bolt and nut;
    whereby the third mounting bolt is pivotally carried by said reinforcement brackets rather than by said lightweight aluminum rib means.

3. In a mounting means as defined in claim 2, said radial rib means comprising a single rib; and said reinforcement brackets being intermediately offset to form an indent in which the cradle bracket is received.

4. In a mounting means as defined in claim 2, said radial rib means comprising a double rib; and said reinforcement brackets being intermediately offset to form an indent in which the cradle bracket is received.

* * * * *